(12) United States Patent
Smid et al.

(10) Patent No.: US 8,417,444 B2
(45) Date of Patent: Apr. 9, 2013

(54) METHOD AND SYSTEM FOR LOCATING AND NAVIGATING AN AUTONOMOUS VEHICLE

(75) Inventors: Edzko Smid, Oxford, MI (US); Tom Stiglich, Troy, MI (US)

(73) Assignee: Nav-Track, Inc., Rochester, MI (US)

( * ) Notice: Subject to any disclaimer, the term of this patent is extended or adjusted under 35 U.S.C. 154(b) by 768 days.

(21) Appl. No.: 12/324,310

(22) Filed: Nov. 26, 2008

(65) Prior Publication Data

US 2009/0138151 A1 May 28, 2009

Related U.S. Application Data

(60) Provisional application No. 60/990,419, filed on Nov. 27, 2007.

(51) Int. Cl.
*G01C 21/00* (2006.01)

(52) U.S. Cl.
USPC .................................................. 701/206

(58) Field of Classification Search ............... 342/443, 342/464; 455/67.14; 382/104
See application file for complete search history.

(56) References Cited

U.S. PATENT DOCUMENTS

| | | | |
|---|---|---|---|
| 6,298,306 B1 | 10/2001 | Suarez et al. | |
| 6,300,905 B1 | 10/2001 | Chen et al. | |
| 7,110,881 B2 | 9/2006 | Gray et al. | |
| 7,132,982 B2 | 11/2006 | Smith et al. | |
| 7,286,624 B2 | 10/2007 | Woo et al. | |
| 7,403,783 B2 | 7/2008 | Cheok et al. | |
| 7,880,608 B2 | 2/2011 | Richards et al. | |
| 2005/0136845 A1* | 6/2005 | Masuoka et al. | 455/67.14 |
| 2005/0171684 A1 | 8/2005 | Turner | |
| 2005/0270234 A1* | 12/2005 | Wolf et al. | 342/443 |
| 2006/0147088 A1* | 7/2006 | Han et al. | 382/104 |
| 2007/0247366 A1* | 10/2007 | Smith et al. | 342/464 |
| 2008/0234930 A1 | 9/2008 | Smid et al. | |
| 2008/0262669 A1 | 10/2008 | Smid et al. | |

FOREIGN PATENT DOCUMENTS

| | | |
|---|---|---|
| WO | 00/38460 A1 | 6/2000 |
| WO | 2005/011153 A1 | 2/2005 |

OTHER PUBLICATIONS

Canadian Intellectual Property Office action in Application No. 2554417 dated Jan. 29, 2010.
US Office Action in U.S. Appl. No. 11/968,884 dated Aug. 24, 2010.
US Office Action in U.S. Appl. No. 11/857,700 dated Mar. 24, 2010.

(Continued)

*Primary Examiner* — Valerie Lubin
(74) *Attorney, Agent, or Firm* — EPIC Law PLLC; Hattem A. Beydoun (57) ABSTRACT

Techniques and methodologies are disclosed for minimizing inaccuracies in distance measurements and location determinations for autonomous vehicles or targets ranging to subsets of beacons. Such techniques and methodologies can be used to better control (e.g., navigate) an autonomous vehicle in an area and/or along a pathway, or trajectory.

20 Claims, 2 Drawing Sheets

OTHER PUBLICATIONS

US Office Action in U.S. Appl. No. 11/857,700 dated Aug. 3, 2010.
US Office Action in U.S. Appl. No. 11/968,884 dated Jan. 14, 2011.
US Office Action in U.S. Appl. No. 12/053,221 dated Aug. 31, 2010.
US Office Action in U.S. Appl. No. 12/053,221 dated Feb. 7, 2011.
US Office Action in U.S. Appl. No. 12/053,208 dated Jun. 30, 2011.
International Search Report and Written Opinion of the International Searching Authority dated Jun. 29, 2009 for Serial No. PCT/US2008/084936.

"Sensor Based Motion Planning: The Hierarchical Generalized Voronoi Graph", Howie Choset, and Joel Burdick, Carnegie Mellon University, Pittsburgh, PA, USA, 1996.
"Path Planning between Two Points for a Robot Experiencing Localization Error in Known and Unknown Environments", Howie Choset, Marco La Civita, and Jong Chul Park, 1999.

* cited by examiner

Fig. -1

METHOD AND SYSTEM FOR LOCATING AND NAVIGATING AN AUTONOMOUS VEHICLE

The present application claims the benefit of the filing date of U.S. Provisional Application Ser. No. 60/990,419 filed Nov. 27, 2007, which is herein incorporated by reference for all purposes.

FIELD OF THE INVENTION

The present invention relates to locating autonomous vehicles, or targets and methods for performing such location.

BACKGROUND OF THE INVENTION

The Global Positioning System (GPS) is based on the fixed location base stations and the measurement of time-of-flight of accurately synchronized station signature transmissions. The base stations for the GPS are geo-stationary satellites and require atomic clocks for synchronization.

GPS has several draw backs including relatively weak signals that do not penetrate heavy ground cover and/or man made structures. Furthermore, the weak signals require a sensitive receiver. GPS also utilizes a single or narrow band of frequencies that are relatively easy to block or otherwise jam. The accuracy of the GPS system relies heavily on the use of atomic clocks, which are expensive to make and operate.

In addition, GPS utilizes a relatively slow update rate; on the order of once per second, which makes it ill suited for use in autonomous navigation of a vehicle. For example, a vehicle traveling at 10 kph would move about 2.75 m in a second. For an autonomous vehicle, significant changes in terrain or direction may occur in this distance, making an update rate of once per second much too slow.

Known triangulation methods are also numerical in nature, so (that no direct solution is readily available to find the location of the target. Rather, these open-form solutions provide only an initial guess and iterative numerical solution to estimate the location of the target. The resolution and accuracy of the location determination suffers accordingly. Further, using an open form solution in three dimensions is very difficult.

It has become increasingly desirable to have vehicles that are able to operate (e.g. move and/or carry out assigned tasks) without direct control from a human operator. Amongst other capabilities, such autonomous vehicles (AVs) have the ability to operate without direct control of a human and allow human operators to remove themselves from the vehicles. Alternatively or additionally, AVs can also permit the human operators to delegate repetitive tasks to the vehicle.

Often, these autonomous vehicles send signals to and/or receive signals from beacons for determining the autonomous vehicles' distance from and/or location relative to those beacons. As an example, U.S. Pat. No. 7,403,783 and U.S. Patent Application No. 2008/0234930, which are herein incorporated in their entireties by reference for all purposes, disclose a system of beacons and the navigation of a target or AV using those beacons.

Another example, U.S. Patent Application No. 2008/0262669, which is herein incorporated by reference for all purposes, discloses a controller for providing a vehicle with autonomous control and a method of providing path planning to an autonomous vehicle. Other examples of systems are disclosed in U.S. Pat. Nos. 7,110,881; 7,286,624; and 7,132,982, all of which are incorporated herein by reference for all purposes.

The signals sent between the AV and the beacons can experience interference from objects located between the AV and the beacons or otherwise and such interference can cause inaccuracy in distance and location determinations. As such, it is typically desirable for the determination of the AVs' distance from and/or location relative to the beacons to account for and/or minimize such inaccuracy. In the interest of overcoming some of the difficulties or drawbacks of prior AV locations systems or methods, the present inventions provides methods and systems for location of an autonomous vehicle, which alleviate inaccuracy in distance and locations determinations of AVs as well as path planning for the AVs.

While traversing a path, it is advantageous for an AV to efficiently range to selected beacons or base stations due to accuracy and time consideration. For example, in a scenario where there is a large multitude of beacons time constrains may prohibit an efficient measuring of ranges to each of the beacons. Moreover, due to non-line-of-sight, and/or excessive range (signal is too weak) it may also difficult for an AV to accurately range to a beacon. Therefore, it is desirable for the AV to know in advance which beacons it is desirable to range to so the AV can receive a response with the most accurate range information. The present invention provides a system and method for locating the position of an autonomous vehicle or target and methods of such location, by allowing select beacons to range to the target at a particular location.

SUMMARY OF INVENTION

In one aspect, the present invention meets some or all of the above-mentioned needs by providing a method for traversing at least a portion of a trajectory by acquiring one or more waypoints of the trajectory, providing a plurality of beacons so that a target traversing the at least a portion of the trajectory can range to a plurality of the plurality of beacons, associating one or more beacons in one or more subsets with one or more waypoints, ranging by the target to one or more beacons in one or more subsets associated with one or more waypoints, where the one or more subsets ranged to is the one or more subsets associated with one or more waypoints the target is in close proximity to compared to the other waypoints, and traversing at least a portion of the trajectory by the target by using range data from one or more beacons in one or more subsets associated with one or more waypoints.

This aspect of the invention may be further characterized by one or any combination of the following features or steps: determining or acquiring confidence indicators for range measurements derived from one or more beacons for one or more waypoints; communicating confidence indicators, where the confidence indicators may be at least in part determined using a Euclidean norm calculation, may be at least in part determined using signal strengths of the signals (signal strength can equate to signal quality) used to determine the range measurements; storing the confidence indicators for later use or modification; associating one or more beacons in one or more subsets with one or more waypoints comprises associating based upon confidence indicators, where one or more beacons comprising a subset for a waypoint have larger (higher) confidence indicators than other beacons when ranging with the target at the waypoint; prioritizing beacons by confidence indicators, where beacons with larger confidence indicators are prioritized over beacons with smaller confidence indicators; calculating weighted values for one or more beacons by comparing confidence indicators of one or more beacons with other beacons for one or more waypoints, using the weighted values to determine the influence that the range measurements have in determining the position of the target; calculating voting values for one or more beacons corresponding to confidence indicators of range measurements derived from one or more beacons for one or more waypoints, using the voting values for one or more beacons for one or more waypoints to determine which beacons comprise one or more subsets associated with one or more waypoints; or calculating offset values for one or more beacons based upon error values of range measurements derived from one or more beacons for one or more waypoints, using the offset values for one or more beacons to adjust range measurements for one or more beacons for one or more waypoints.

In another aspect, the invention is contemplated to cover a method for traversing at least a portion of an area which may comprise mapping the area into a plurality of cells; providing a plurality of beacons throughout the area; associating one or more beacons in one or more subsets with one or more cells; ranging by a target to one or more beacons in one or more subsets associated with one or more cells; wherein the one or more subsets ranged to is the one or more subsets associated with one or more cells the target is located within or in close proximity to compared to other cells, and traversing at least a portion of the area by the target by using range data from the one or more beacons in one or more subsets associated with one or more cells.

This aspect of the invention may be further characterized by one or any combination of the following features or steps: determining or acquiring confidence indicators for range measurements derived from one or more beacons for one or more cells; communicating confidence indicators; the confidence indicators are at least in part determined using a Euclidean norm calculation; the confidence indicators are at least in part determined using signal strengths of the signals (including signal quality) used to determine the range measurements; storing the confidence indicators for later use or modification; associating one or more beacons in one or more subsets with one or more of cells comprises associating based upon confidence indicators; one or more beacons comprises a subset for a cell have larger confidence indicators than other beacons when ranging with the target located within the cell; prioritizing beacons by confidence indicators, where beacons with larger confidence indicators are prioritized over beacons with smaller confidence indicators; calculating weighted values for one or more beacons by comparing confidence indicators of one or more beacons with other beacons for one or more cells; using the weighted values to determine the influence that the range measurements have in determining the position of the target; calculating voting values for one or more beacons corresponding to confidence indicators of range measurements derived from one or more beacons for one or more cells, using the voting values for one or more beacons for one or more cells to determine which beacons comprise one or more subsets associated with one or more cells; calculating offset values for one or more beacons based upon error values of range measurements derived from one or more beacons for one or more cells; or using the offset values for one or more beacons to adjust the range measurements for the one or more beacons for one or more cells.

In another aspect, the invention is contemplated to cover a locating system, comprising a plurality of beacons, a target equipped to communicate with the plurality of beacons, and subsets of beacons selected from the plurality of beacons, wherein the plurality of beacons includes the subsets of beacons and remainder beacons, the remainder beacons being separate from the subset of beacons; and the target is located by data communicated between the target and one or more of the subsets of beacons without using data for guidance from the remainder beacons.

This aspect of the invention may be further characterized by one or any combination of the following features or steps: the subsets of beacons are selected based upon an algorithm; the subsets of beacons includes a current subset of beacons, which is a set of beacons that is being used for determination of location of the target at a particular time or location during which the target is traveling; a trajectory, wherein the trajectory comprises a plurality of waypoints; one or more of the waypoints comprising the trajectory are associated with beacon identifiers identifying a desired subset of beacons of the plurality of beacons that experience a relatively larger confidence indicator compared to other beacons not in the desired subset of beacons; the current subset of beacons is the same as the desired subset of beacons for a selected waypoint; the current subset of beacons is a selection or mixture of beacons selected from the desired subset of beacons for a first waypoint and the desired subset of beacons for a second waypoint when the target is traveling between the first waypoint and the second waypoint; the target takes and records confidence indicator values for each waypoint or other locations during travel along the trajectory and records the confidence indicator measurement and uses or transmits the confidence indicator measurement the next time the target or another target travels the trajectory; the target's location is determined using signals traveling between the target and the desired subset of beacons wherein the beacons comprising the desired subset of beacons have larger confidence indicators at a particular location or waypoint than other beacons of the plurality of beacons; one or more sectional maps forming cells wherein the one or more sectional maps include confidence indicators that correlate locations on the one or more sectional maps with the confidence indicators when the autonomous vehicle is at those locations on the one or more sectional maps; or the current subset of beacons compromises beacons with relatively larger confidence indicators at a particular location or waypoint than other beacons of the plurality of beacons.

DETAILED DESCRIPTION

The present invention is predicated upon the provision of control and determining location of autonomous vehicles (AVs), particularly locating and controlling the path planning and guidance of autonomously guided vehicle (AGVs or target) in an area of space. The AGV may typical traverse a path based upon a trajectory. The trajectory is typically described by a series of waypoints that are located within a reference frame. For example, the trajectory may be a series of waypoints that are indicated by coordinates (e.g., 1-dimensional, 2-dimensional (2-D) or 3-dimensional (3-D)) in a coordinate system that has been set up for a global or local reference frame such as a map, a space, a plane, a terrain, a city block or the like. The waypoints, if desired, can include a time stamp for velocity reference for the path following control scheme.

The location or position and/or the heading of the AGV can be determined using a plurality of beacons (or base stations) examples of illustrative beacons are described in U.S. Pat. No. 7,403,783 (see column 3, line 61 to column 4, line 67) and U.S. Patent Application No. 2008/0234930, which are herein incorporated in their entireties by reference for all purposes. Alternatively or additionally, the plurality of beacons can be used only for determination of position or location while orientation or heading of the vehicle can be derived from motion of the vehicle relative to the beacons, or from other sensor inputs.

A reference frame or operating area in which the path is located for the AGV to travel may typically include a plurality of beacons available for assisting in determining location of the vehicle within the reference frame and/or distances of the vehicle from the beacons. The plurality of beacons within the reference frame may include large numbers of beacons (time constrains would not permit ranging to all the beacons), they may include more beacons than needed to calculate or determine the AGV's position, or both. Typically, the systems and methods herein are operated and/or configured to take into account the likelihood that the AGV will not be able to take a reference measurement (e.g., a measurement of distance from the beacon) for each beacon of the plurality of beacons, due to non-line-of-sight, excessive range (signal is too weak) or simply because of time constraints. Accordingly, it is possible that the redundancies herein in the beacon arrangement help to overcome or reduce the instances when beacon communication is lost or impaired, or time constraint do not permit ranging to all of or a majority of the beacons, as compared with other systems that do not include the methods or systems herein.

When the number of beacons in the plurality of beacons is large (i.e. time constraints would not permit ranging to all the beacons of a large number of beacons), it can be desirable for the determination of distances between the AGV and the beacons and the determination of the location of the AGV may be done using a selection or subset of the beacons rather than all of the plurality of beacons. As such, it can be desirable for the system and particularly the AGV to intermittently or substantially continuously make decisions on which beacons of the plurality of beacons to use when following the trajectory and/or pathway. Thus the methods and systems herein contemplate a dynamic process of selecting beacons based upon changes of circumstances during operation. Disclosed herein are multiple methods for selectively using subsets of beacons from the plurality of beacons of a reference frame for guiding and making distance and location determinations for an AGV. It can be understood that these multiple methods can be used separately or together.

As indicated, the methods and systems herein make use of information about a trajectory of a target. The trajectory may be generated off-line (i.e., in advance of following the trajectory), on-line (i.e. during a trajectory following exercises), or both. The AGV may be capable of generating a temporary path to avoid a particular threat event or object in the pathway. The trajectory may be generated by a human operator (i.e. by drawing on a map of an aerial photograph), by a path-planning algorithm (i.e. a route planner of a navigation system), or both.

With knowledge of the beacon locations and the waypoints of the trajectory, an algorithm can be created or employed for selecting one or more subsets of beacons of the plurality of beacons to use when following the path to each waypoint in the trajectory. It is contemplated that instead of the one or more subsets of beacons, the system could use a single beacon, however, at least one subset of plural beacons is typically desired (e.g. a subset of 3 to about 5 beacons). This one or more subsets can still provide some redundancy in the number of beacons and/or the number of measurements, determinations (e.g., determinations of distance of the AVG from the beacons or of location of the AVG) and/or calculations, however, it is preferably less than the redundancy of using each of the plurality of beacons. For developing the one or more subsets, the methods of the present invention may be used together and cooperatively or separately as is discussed further below.

The AGV (also denoted herein as a target) is transformed by information derived from the methods or systems herein. For example, in response to a certain condition detected by the use of the beacons and other system/components herein, the AGV may accelerate, decelerate, cease operation, commence operation, change direction, increase applied power, decrease applied power, perform some operation (e.g. actuate a functional device), store information, transmit information, or any combination thereof. It should be understood that, when discussed in this manner, the AGV is considered to include a processing unit (e.g., a computer, a central processing unit (CPU), controller or the like) such as the one discussed in U.S. Pat. No. 7,403,783 and/or U.S. Patent Application No. 2008/0234930 hereby incorporated by reference in their entirety for all purposes (see e.g. FIG. 6 of U.S. Patent Application No. 2008/0234930). It should be understood that while such a processing unit can be attached to or located with the AGV, it may also be remotely located and in signaling communication with the vehicle. In either instance, the processing unit is to be considered as part of the AGV, unless otherwise specified. It should also be noted that the range calculations may be intiated by the beacons rather than the target.

According to one aspect of the present invention, the trajectory waypoints can be associated with beacon identifiers and the waypoints and identifiers can be stored in memory of the process unit of the AGV or otherwise in a processor such as a computer. The AGV can then be programmed to, based upon its current location, select a desired subset of the plurality of beacons for guiding the AGV along the trajectory and/or the pathway.

When following the trajectory or pathway, the AGV can be programmed to use only reference measurements (e.g., distance measurements) from the desired subset of beacons associated by the beacon identifiers with the waypoint that the AGV is either located at, traveling toward or traveling away from, Additionally or alternatively, the AGV may use reference measurements (e.g., distance measurements) from a desired subset of beacons associated by the beacon identifiers with two waypoints between which the AGV is traveling. Such desired subsets can be all of the beacons associated with the two waypoints or a subset of the beacons associated with the two waypoints. The desired subset of beacons as determined in this manner can typically change as the AGV travels between different waypoints. Moreover, this desired subset of beacons can be part of or the entirety of the one or more subsets of beacons used by the AGV to traverse its pathway as defined by the trajectory.

Figure 1:
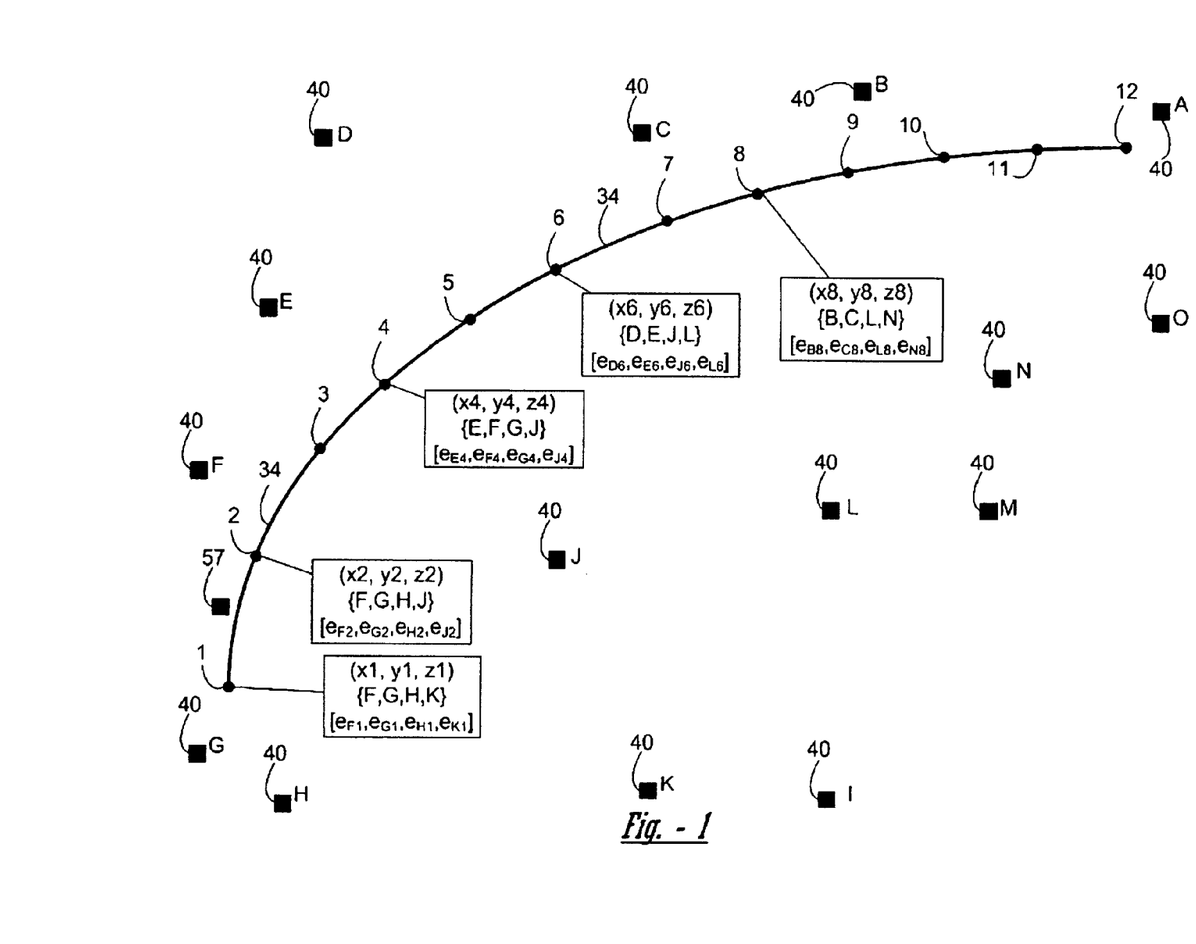
FIG. 1 is a diagram of overall exemplary embodiment of the present invention.

With reference to FIG. 1, there is illustrated an exemplary trajectory 34 for a target 57 defined by a plurality of waypoints (e.g. waypoints 1,2,3,4,5,6,7,8,9,10,11, and 12), and a plurality of beacons 40 (A-O). For example, as can be seen, each of the waypoints 1 through 12 is recorded, assigned, or associated with a subset (enclosed in { } in FIG. 1) of beacons 40. In FIG. 1, the subsets are identified by brackets { }. For example, a first subset (e.g. subset {F,G,H,K}), may be associated with a first waypoint (e.g. waypoint 1), at a first set of coordinates (e.g. (x1, y1, z1)). The first subset may be associated with a plurality of beacons (e.g. beacons 40F, 40G, 40H and 40K). These subsets are suitable for guiding or locating the AGV when it is located at, in the proximity of, or as it is traveling toward or traveling from the specific first waypoint to a second waypoint where the same or a different subset (e.g. having a different subset of beacons) is employed for guiding or locating the AGV (i.e. when the AGV is traveling from waypoint 1 to waypoint 2, subsets {F,G,H,K} and subsets {F,G,H,J} or a combination thereof can be used to locate or guide the AGV).

In general, the AGV will intermittently and/or continuously update its current knowledge of its location and orientation within the coordinate system. To do this, it may estimate and evaluate the accuracy of the range values returned from each of the beacons. For instance, a comparison can be made between the range measurement returned from the beacon with the Euclidean distance between the known beacon position and the calculated AGV position (i.e. Euclidean norm).

Figure 2:
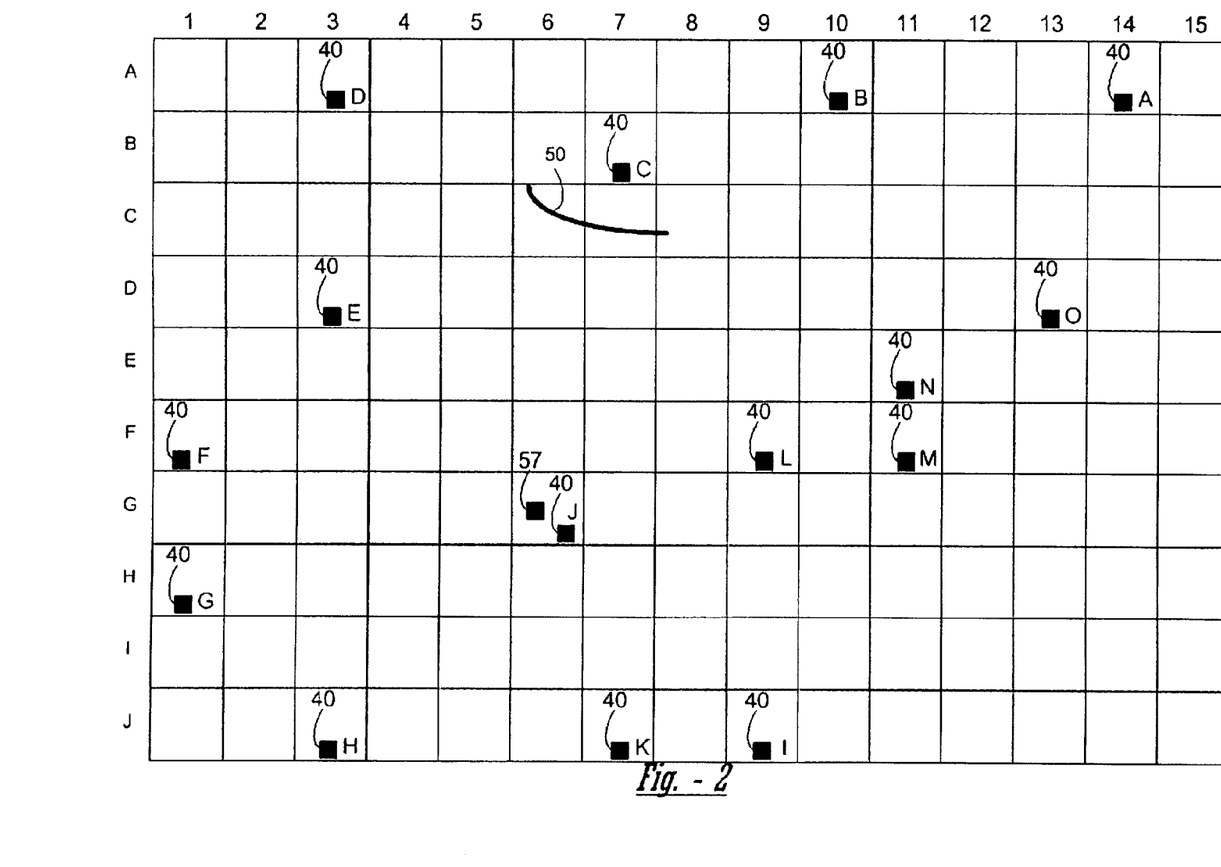
FIG. 2 is a diagram of another exemplary embodiment of the present invention.

It is possible that, in some regions in the trajectory, measurements to a particular beacon may be erroneous, and/or the signal level and the quality of the signal received from the beacon by an AGV may be weak or poor (for instance due to be perturbations—e.g., objects between the AGV and the beacon, such as obstacle 50 in FIG. 2). Oftentimes, these errors are consistent with the location of the measurement to the particular beacon. The value of the errors and the signal strength and signal quality can be stored in memory along with the beacon identifiers at the particular waypoint. Moreover, error values and single strength values and single quality values can be used to determine confidence indicator values wherein a relatively larger or higher confidence indicator value corresponds to a relatively lower error value, higher signal strength, and higher signal quality. In FIG. 1, error values are contained in square brackets [ ]. Each range measurement to each beacon has an error value, for example, the error of the range measurement to beacon 40F at waypoint 1 is $e_{f1}$). Each time the AGV, or another AGV that can operate within the system, follows the path at the particular waypoint, it may include a step by which it anticipates the error, and makes a correction that is operating within the system in calculating a position. The same can be done for signal strength values as well as signal quality values.

The invention herein also takes into account the evaluation of confidence levels in the prediction or determination of locations. Such evaluations may be made from information such as signal strengths, time between readings, readings that deviate from a predicted value, or the like. For example, confidence levels may be ranked from low to high levels. Depending upon a ranking the system may take different steps. For example, if it is determined that a range to a particular beacon has a relative low confidence indicator then there can be a number of methods to compensate for this. These methods include, but are not limited to, beacon replacement, offset correction, voting, weighting, or any combination thereof.

Beacon replacement can be used to compensate for a beacon having relative low (compared to other beacons) confidence indicators (i.e. large error values, poor signal strength, low signal quality) by replacing said beacon in the subset with another beacon currently not in the subset with relatively higher confidence indicators. This might be a step that is performed on the fly, while the system is in operation.

Offset correction may be used to compensate for a beacon of sufficiently large error by adjusting (e.g. adding or subtracting a value) the range measured to correct for the error. For example, if a range measurement is measured at 10 meters, and the offset correction is −1, the range measurement may be adjusted to 9 meters using the offset correction.

Voting may be used to compensate for a beacon having relatively low (compared to other beacons) confidence indicators by not including the range measurement in the determination or calculation of the position of the target.

Weighting may be used to compensate for a beacon having relatively low (compared to other beacons) confidence indicators by minimizing its contribution to the determination or calculation of the position of the target. For example, if a first beacon has a confidence indicator of 1, and a second beacon has a confidence indicator of 2, then the second beacon may have twice the influence in calculating the range measurement of a target than the first beacon.

The operational area of the AGV can also be divided into a sectional map as shown in FIG. 2. For example, the operational area can be divided into a plurality of sections, or cells (e.g. as in a grid or a checkerboard). These cells do not have to be squares or rectangular, and can be defined in any shape or form and by any method such as for example the Voronoi Diagram, published in "Path Planning between Two Points for a Robot Experiencing Localization Error in Known and Unknown Environments" by Howie Choset, et. al., *FSR '99 Proceedings of the International Conference on Field and Service Robotics*, August, 1999, pp. 98-103 (see FIG. 2 of this reference) hereby incorporated by reference in its entirety for all purposes. Each section of the map can include data correlating confidence indicators that indicates information such as the relative predicted signal quality, signal strength or error of range measurement for each beacon in the operational area, or any combination thereof. These confidence indicators can, for example, range from 0 (very poor) through 100 (very good). When operating in a particular cell, the AGV can utilize the confidence indicators corresponding to that cell to determine which beacons to utilize. Preferably, beacons with the highest confidence indicator values will be used for determining position. Thus the methods and systems herein contemplate ranking beacons according to confidence indication and then forming a subset of a plurality of beacons tat have a predetermined confidence level (e.g. forming a subset of a plurality beacons that have confidence indicators that are substantially the same as each other, are within a predetermined range of confidence indicators, or both.

Analysis of confidence indicators and readjustment of the methods and system based thereon may be ongoing. It may be performed intermittently at preselected intervals, it may be performed continuously, or according to some other sequence. Confidence indicators will generally be assigned by comparing signal strength (if any), signal qualify (if any), or both against a previous signal, against a predetermined value, or both. For example, systems and/or methods herein may include one or more data acquisition devices (e.g. which may include or be in communication with at processor) to which a radiofrequency signal is transmitted via a satellite from an AGV. Any signal recognized by the data acquisitions devices(s) may be compared with a prior signal received, with a pre-programmed signal value, or both. The confidence indicators for a particular cell in the sectional map may be updated based on signal strength, signal quality, and/or error value measured while the AGV is located in any cell. The error value can be calculated by using the Euclidean norm of the beacon position and the calculated AGV position. For that purpose, the AGV may regularly range to one or more beacons with lower confidence levels then those used to position, only for the purpose of updating the confidence indicators. As an example, confidence indicators may be decremented in a certain amount (e.g. towards 0) when the associated error values, signal strengths, and/or signal quality exceed a predetermined threshold reflecting poor qualities/attributes (i.e.

relative large error, low signal strength, poor signal quality). They may be incremented in a certain amount (e.g. upwardly towards 100 when the error values are relative small, the signal strength is relative high, the signal quality is relatively high (when compared to other beacons). Note, it may be necessary to increase or decrease the error/signal strength/ signal quality thresholds in the event that the totality of confidence indicators are 0 or 100 respectfully.

The confidence indicators in each cell can be based on a system of ranking based on beacon error values/signal strength/signal quality determined from AGV while ranging to the beacons while in the cell. The confidence indicators can be stored and or/transmitted to and from multiple beacons and/or multiple targets by the beacons themselves or by the AGV. It is understand that this information can be shared among several AGVs in the event more than one AGV is in use regardless where the information is stored. It is assumed that all confidence indicators are assigned a neutral value, for example, at 50, during initialization in which instance beacons are initially randomly chosen.

With reference to FIG. 2, an exemplary operational area in which the area has been divided into cells. Each cell is associated with confidence indicators. For instance when the AGV is operating in cell G6, it is anticipated that the confidence indicators corresponding to beacons K, E, F, H will be higher than the confidence indicators corresponding to C due to the obstacle 50 between the AGV and beacon C.

A recurrent measurement and positioning scheme may additionally or alternatively be employed such as for guiding the AGV. While the AGV is following a pathway according to a trajectory, it can continuously or intermittently predict the value and rate-of-change of this value for the reference measurement of each of the beacons. For example, in the case of range measurements, the AGV can constantly predict the range and rate-of-change of the range to each of the individual beacons.

The AGV can then conduct a round-robin approach to ranging to a set of beacons. Each time a new reference measurement is acquired, it can be used to update the prediction of the value of that measurement, and a new position can be calculated based on the predicted estimation of the reference measurements. Then the AGV can acquire a measurement to a next beacon and so on. If a measurement fails, the predicted value may or may not be used in the position calculation.

Additional internal and external sensors or sensor inputs (e.g., velocity and acceleration inputs) to the AGV can be used to update the prediction of the reference measurements.

Effectively, this concept can employ the operation of two separate processes inside the AGV. The first process can continuously and/or intermittently update the estimated reference measurement of each of the beacons. For example a Kalman Filter or even a Double Kalman Filter as disclosed in "Fuzzy Neighborhood Filters for UWB Range Radios in Multipath Environments" by Ka C. Cheok et. al., *Proc. SPIE, Vol.* 6979, 69790J (2008); DOI:10.1117/12.782266 hereby incorporated by reference in its entirety for all purposes, and correct these estimates with actual measurement data. The second process can, concurrently or at different times, constantly or intermittently calculate the position of the AGV using the estimated reference measurements of the beacons.

As suggested above, the methods and techniques of the present invention can be employed separately or together. For example, each of the waypoints can be associated with beacons for creating a subset of beacons and then within that subset of beacons a secondary subset of beacons may be selected using confidence indicators resulting in a particularly desirable subset of beacons from the plurality of beacons. As another example, the updating mechanisms discussed for the present invention can be used for adding or subtracting beacons from the one or more subsets of beacons and such mechanisms can be employed in conjunction with or separated from the designation of particular beacons for each waypoint and/or the selection of beacons using confidence indicators.

Use of the methods of the present invention can have multiple advantages. As one potential advantage, the AGV may not have to calculate a selection of the beacons to be used for positioning where the beacon selection is pre-programmed. Of course, these calculations may be employed in conjunction with the techniques and methodologies of the present invention. As another potential advantage, the AGV can avoid trying to take reference measurements to beacons that it can not be able to measure to, thus saving time during the path following operation. In turn, saving time for selecting the appropriate subset of beacons can allow for the AGV to increase the rate of calculating location estimates, which can improve the performance of the path following scheme. As a further potential advantage, the AGV may be able to anticipate the perturbation of the reference measurement to particular beacons at or adjacent the particular waypoints the next time it follows the trajectory, for improved waypoint following performance. As a result, the AGV may be able to increase the following speed, when following the trajectory, once it has driven on it before.

It can be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It can also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method for traversing a trajectory by an autonomous vehicle, comprising:
   i) associating one or more beacons in one or more subsets with one or more waypoints of the trajectory by an operator or the autonomous vehicle,
      wherein the one or more beacons are associated in the one or more subsets based upon at least confidence indicators for range measurements derived from one or more beacons for one or more waypoints; wherein the confidence indicators are at least in part determined using a combination of signal strength, signal quality, and error values for range measurements; and further wherein one or more beacons comprising a subset of beacons for a waypoint have larger confidence indicators than other beacons when ranging with the autonomous vehicle at the waypoint;
   ii) ranging by the autonomous vehicle to the one or more beacons in the one or more subsets associated with the one or more waypoints that the
   autonomous vehicle is either located at, traveling toward, or traveling away from to determine the location of the autonomous vehicle; and
   iii) traversing the trajectory by the autonomous vehicle by using the location of the autonomous vehicle.

2. The method of claim 1, further comprising the autonomous vehicle acquiring confidence indicators from memory.

3. The method of claim 1, further comprising the autonomous vehicle communicating the confidence indicators.

4. The method of claim 1, wherein the confidence indicators are at least in part determined using a Euclidean norm calculation.

5. The method of claim 1, further comprising the autonomous vehicle storing the confidence indicators for later use or modification.

6. The method of claim 1, further comprising the autonomous vehicle calculating weighted values for one or more beacons by comparing confidence indicators of one or more beacons with other beacons for one or more waypoints, wherein the weighted values determine the influence that range measurements have in determining the location of the autonomous vehicle.

7. The method of claim 1, further comprising the autonomous vehicle prioritizing beacons by confidence indicators, wherein beacons with larger confidence indicators are prioritized over beacons with smaller confidence indicators.

8. The method of claim 1, further comprising the autonomous vehicle calculating voting values for one or more beacons corresponding to confidence indicators of range measurements derived from one or more beacons for one or more waypoints, wherein the voting determine which beacons comprise one or more subsets associated with one or more waypoints.

9. The method of claim 1, further comprising the autonomous vehicle calculating offset values for one or more beacons based upon error values of range measurements derived from one or more beacons for one or more waypoints, wherein the autonomous vehicle adjusts range measurements for the one or more beacons for the one or more waypoints based upon the offset values.

10. A method for an autonomous vehicle to traverse at least a portion of an area having a plurality of beacons, comprising:
    i) mapping the area into a plurality of cells by an operator or the autonomous vehicle;
    ii) associating one or more beacons in one or more subsets with one or more cells by the operator or the autonomous vehicle,
       wherein the one or more beacons are associated in the one or more subsets based upon at least confidence indicators for range measurements derived from one or more beacons for one or more cells; wherein the confidence indicators are at least in part determined using a combination of signal strength, signal quality, and error values for range measurements; and further wherein one or more beacons comprising a subset of beacons for a cell have larger confidence indicators than other beacons when ranging with the autonomous vehicle in the cell;
    iii) ranging by the autonomous vehicle to the one or more beacons in the one or more subsets associated with the one or more cells that autonomous vehicle is located in to determine the location of the autonomous vehicle; and
    iv) traversing at least a portion of the area by the autonomous vehicle by using the location of the autonomous vehicle.

11. The method of claim 10, further comprising the autonomous vehicle acquiring confidence indicators from memory.

12. The method of claim 10, further comprising the autonomous vehicle communicating confidence indicators.

13. The method of claim 10, wherein the confidence indicators are at least in part determined using a Euclidean norm calculation.

14. The method of claim 10, further comprising the autonomous vehicle storing the confidence indicators for later use or modification.

15. The method of claim 10, further comprising the autonomous vehicle calculating weighted values for one or more beacons by comparing confidence indicators of one or more beacons with other beacons for one or more cells, wherein the weighted values determine the influence that the range measurements have in determining the position of the autonomous vehicle.

16. The method of claim 10, further comprising the autonomous vehicle prioritizing beacons by confidence indicators, wherein beacons with larger confidence indicators are prioritized over beacons with smaller confidence indicators.

17. The method of claim 10, further comprising the autonomous vehicle calculating voting values for one or more beacons corresponding to confidence indicators of range measurements derived from one or more beacons for one or more cells, wherein the voting values determine which beacons comprise one or more subsets associated with one or more cells.

18. The method of claim 10, further comprising the autonomous vehicle calculating offset values for one or more beacons based upon error values of range measurements derived from one or more beacons for one or more cells, where the autonomous vehicle adjusts range measurements for the one or more beacons for the one or more cells based upon the offset values.

19. A locating system, comprising:
    i) a plurality of beacons;
    ii) an autonomous vehicle equipped to communicate with the plurality of beacons;
    iii) a trajectory for the autonomous vehicle to traverse, said trajectory having one or more waypoints; and
    iv) subsets of beacons selected from the plurality of beacons, wherein beacons comprising a subset of beacons for a waypoint iv) . . . comprise confidence indicators for range measurements,
       wherein the confidence indicators are at least in part determined using a combination of signal strength, signal quality, and error values for range measurements; wherein the beacons comprising a subset of beacons for a waypoint have larger confidence indicators than other beacons when ranging to the autonomous vehicle at the waypoint;

wherein the autonomous vehicle is located by data communicated between the autonomous vehicle and one or more of the subsets of beacons for a waypoint that the autonomous vehicle is either located at, traveling toward, or traveling away from, further wherein the subsets of beacons are selected based upon an algorithm.

20. The system of claim 19, further comprising one or more sectional maps forming cells wherein each cell is associated with confidence indicators for beacons, wherein the autonomous vehicle ranges to beacons having higher confidence indicators for a particular cell compared to other beacons in the particular cell while the autonomous vehicle is located within the particular cell.

* * * * *